Feb. 19, 1963 P. W. DILLON ETAL 3,078,325
ELECTRIC ARC FURNACE POWER CABLE ARRANGEMENT
Filed June 16, 1959 3 Sheets-Sheet 1
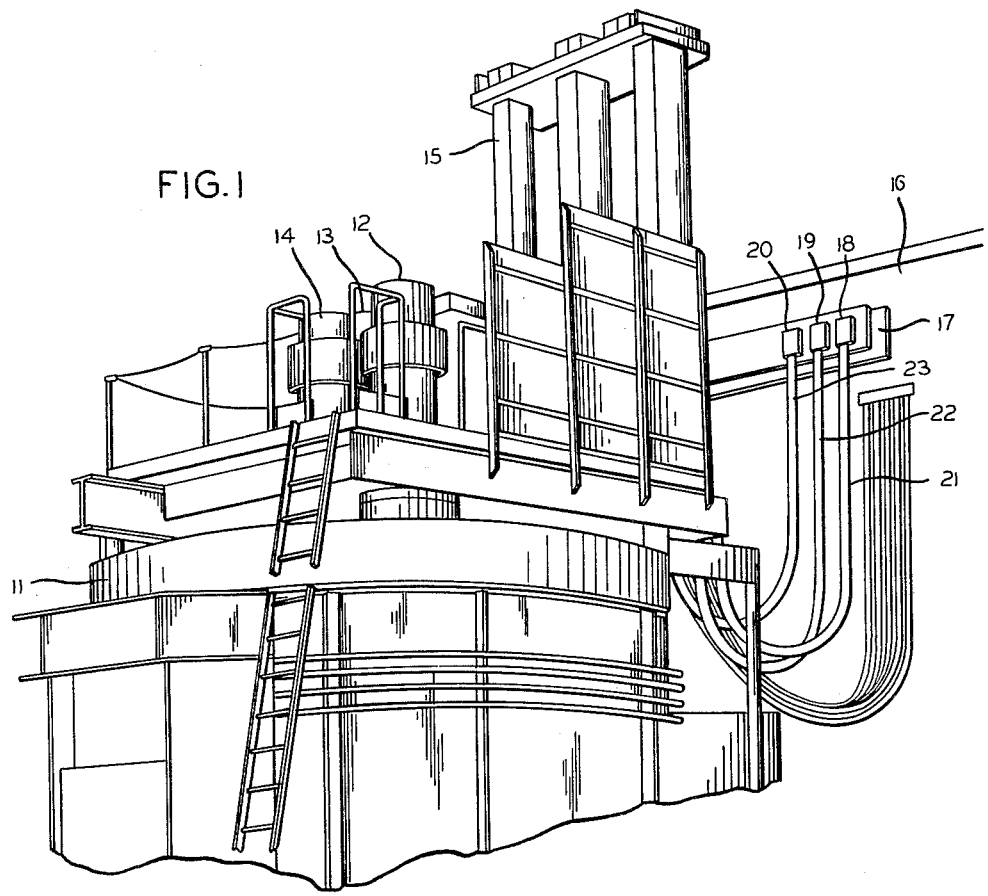
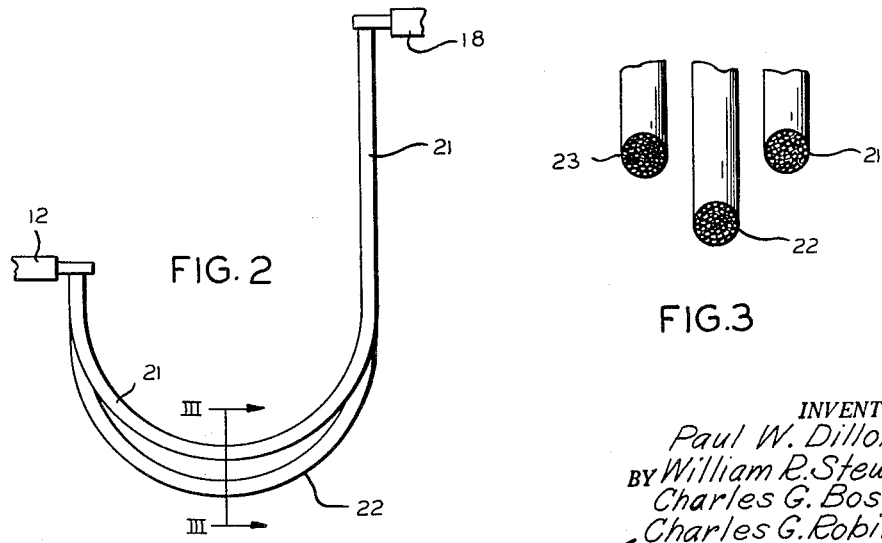
INVENTORS
Paul W. Dillon
BY William R. Stewart
Charles G. Bosco
Charles G. Robinson
ATTORNEYS Feb. 19, 1963 P. W. DILLON ETAL 3,078,325
ELECTRIC ARC FURNACE POWER CABLE ARRANGEMENT
Filed June 16, 1959 3 Sheets-Sheet 2

INVENTORS
Paul W. Dillon
BY William P. Stewart
Charles G. Bosco
Charles G. Robinson
ATTORNEYS

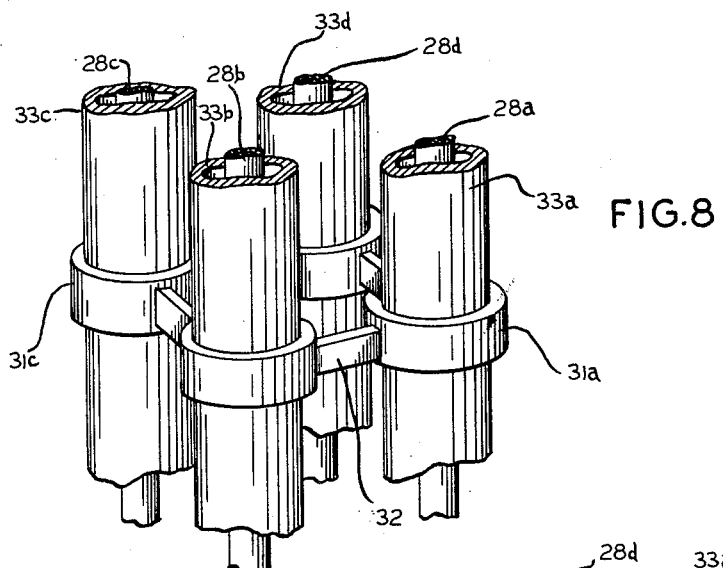
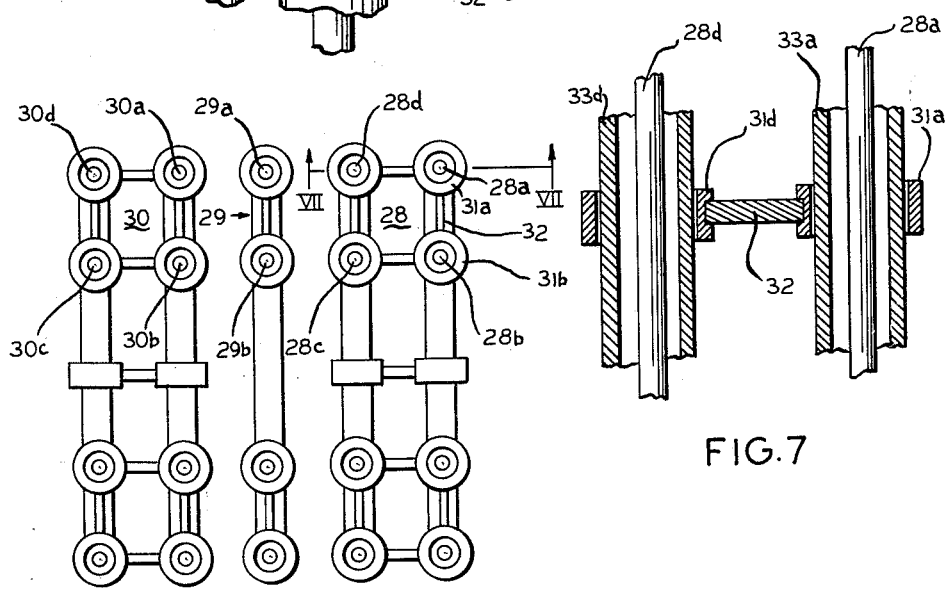
FIG. 8
FIG. 7
FIG. 6

United States Patent Office 3,078,325
Patented Feb. 19, 1963

3,078,325
ELECTRIC ARC FURNACE POWER CABLE
ARRANGEMENT
Paul W. Dillon, William R. Stewart, Charles G. Bosco, and Charles G. Robinson, Sterling, Ill., assignors to Northwestern Steel & Wire Company, Sterling, Ill., a corporation of Illinois
Filed June 16, 1959, Ser. No. 820,758
5 Claims. (Cl. 13—9)

This invention relates to a power cable arrangement for electric arc furnaces and more particularly to such an arrangement which is particularly adapted to balance and reduce the impedances in the respective phases of a multi-phase arrangement in order to supply greater power to the furnace in a more efficient desirable manner than has heretofore been possible.

Electric arc furnaces for the production of steel from scrap have become relatively well known in the art. Such furnaces are commonly available in sizes up to 25,000 kva. In such a large installation, down time for any reason is quite expensive. In practice, such furnaces usually have three electrodes which are included in a three phase power supply system. Each of the electrodes may be provided with an electrode position regulator to maintain equal arc power consumption by varying the length of the arc and hence the electrical resistance of the arc.

It has been found that as a practical matter two alternatives are available based on previously known techniques. In the past it has been necessary to choose between increased consumption of the electrode or increased down time due to refractory burning. Using previously known power cable arrangements, when all of the electrodes are operated at the same level with respect to the melt, a current unbalance exists such that one electrode operates at a much higher current than the other two electrodes. This arises primarily from an impedance unbalance between the three phases in the power cable arrangement. Undesirable down time occurs as an indirect result of this. In order to equalize the current between the phases the electrode with the highest current is moved away from the melt until its current magnitude is equal to the other two phases. The increased arc length that results exposes the refractory lining of the furnace to the intense heat of the arc and causes the lining to be burned away at an excessive rate. This refractory burning causes the down time. As a practical matter it has frequently been decided in the past that operation with the currents unbalanced was less expensive than the down time, but such unbalanced operation results in a substantial increase in carbon consumption in the electrode carrying the highest current.

With the foregoing in mind, it is an object of this invention to provide means for obtaining balanced currents without exposing the refractory lining to an unnecessary amount of heat from the arc.

It is a further object of this invention to provide a power cable arrangement for an electric arc furnace wherein the impedances between different phases are balanced.

It is a still further object of this invention to provide apparatus for supplying power to an electric arc furnace in such a manner as to afford improved efficiency and economy of operation of the furnace.

It is a further object of this invention to provide for an electric arc furnace a power cable arrangement utilizing symmetrically spaced water cooled cables to substantially balance the impedances between the various phases of a multi-phase arrangement in order to provide improved efficiency of operation of the furnace.

Briefly, in accordance with one aspect of this invention, the impedances between the various phases may be balanced by increasing the length of the flexible cables used in that phase which normally has the lowest impedance and hence the highest current. That is to say, where it is desired to continue to use the commonly used arrangement of air cooled cables wherein a group of such cables is connected in parallel for each of the phases of a three phase system, it has been found that if the phase having the lowest impedance is made longer than the other two phases the impedances of the three phases can be balanced. Alternatively, in accordance with another aspect of this invention, the air cooled cable arrangement may be replaced with a smaller number of water cooled cables per phase and these cables may be held in a predetermined spaced relationship to each other such that the impedances between the phases may be balanced and such that the absolute values of the impedance of each phase may be reduced in order to transmit more power to the arc. The spacing between the individual cables is such as to reduce self-induction and the spacing between the phases is such as to balance the mutual coupling. Due to the spacers provided to assure predetermined spacing of the water cooled cables the flux pattern is spread out and more flux is dissipated in air rather than in adjacent cables. That is to say, the inductive impedance is reduced thereby delivering more power into the arc for a given applied voltage level. The arrangements to be described in detail below have been found in practice to afford a 12 to 15% increase in the useful power input to the furnace for a given applied voltage. The overall increased efficiency of operation in the furnace based upon the greater power delivered, the reduced electrode consumption, and the minimization of down time due to refractory burning results in a very substantial saving in the cost per ton of operating a given furnace.

Other objects, features, and advantages of the present invention will be more fully apparent to those skilled in the art from the following detailed description taken in connection with the accompanying drawings in which like reference characters refer to like parts throughout and wherein:

FIGURE 1 is a perspective view of an electric arc furnace of the type with which the cable arrangement of the present invention is adapted to be used.

FIGURE 2 is a fragmentary elevational view somewhat diagrammatically showing one possible arrangement of flexible cables for supplying power to a furnace of the type shown in FIGURE 1.

FIGURE 3 is a sectional view taken on the line III—III of FIGURE 2.

FIGURE 6 is a sectional view partly in elevation taken on the line VI—VI of FIGURE 4.

FIGURE 7 is a sectional view on an enlarged scale taken on the line VII—VII of FIGURE 6.

FIGURE 8 is a perspective view of the cables and their spacer devices forming one phase of the cable arrangement shown in FIGURES 4 through 7.

Figure 4:
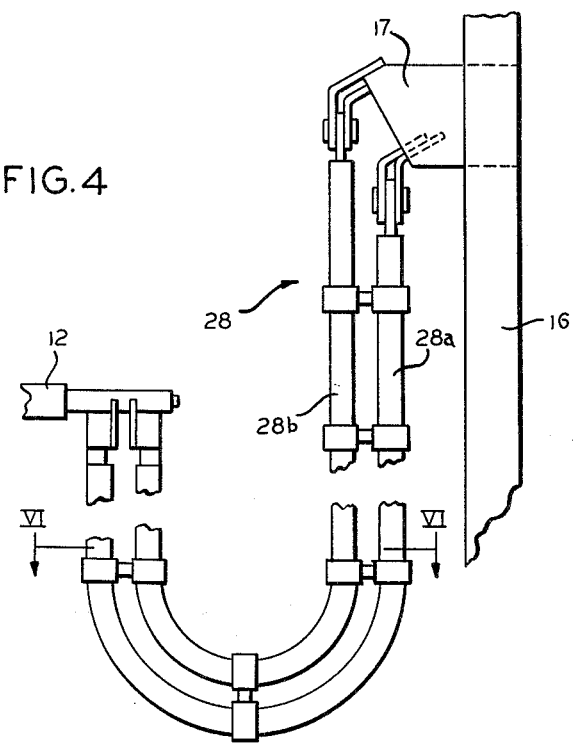
FIGURE 4 is a view similar to FIGURE 2 but showing a second cable arrangement wherein water cooled cables with a predetermined relative spacing are used.

During recent years the electric arc furnace has found increasing use in the steel industry. Such furnaces afford a high concentration of heat combined with highly efficient energy utilization, easy regulation and operation, flexibility, and contamination free melting and refining. In view of these advantages the present trend is toward larger and larger furnaces wherein any down time of the type discussed above becomes extremely expensive.

As is well known such a furnace consists usually of a large cylindrical housing having a refractory lining and being provided with a set of three movable carbon electrodes which can be adjusted in height with respect to the top surface of scrap steel or other material to be melted in the furnace. Power is supplied to the electrodes through flexible cables which usually extend from the top of the electrodes to connecting means normally mounted adjacent the furnace on a brick or other wall of the building in which the furnace is housed. The wall mounted connecting means in turn are connected through the wall to a power transformer which may be conveniently housed in a concrete housing outside the wall to afford explosion protection. The primary winding of the transformer may of course be connected to any suitable source of electrical energy. The basic electrical circuit of the arc furnace therefore comprises a source of electrical power connected to the primary of the furnace transformer, the secondary of the furnace transformer being connected through flexible cables to the top of movable electrodes. The arc of course is struck from the tips of the electrodes to the material to be melted which serves as a common ground point in the circuit. In practice, the circuit is normally of the three phase type. In such a circuit the arc resistance for each phase is a variable which has a magnitude determined by the positioning of the electrode with respect to the melt. This arc resistance can be zero when the electrode is in contact with the melt or it can approach infinity as the arc is extinguished. In general, the greater the distance of the electrode tip from the melt the higher is the resistance of the arc. The voltage drop across the arc may thus range from zero at short circuit conditions to the full transformed line voltage under upon circuit conditions. Of course, the arc resistance and the impedance in the rest of the above outline circuit are in series with each other and act as a voltage divider. Since it is desired to supply as much power as possible to the arc itself at a given voltage level it is therefore desirable to reduce the circuit impedance as much as possible while maintaining the impedances of the three phases balanced for the reasons discussed above. It will of course be realized that the power delivered is basically given by the product of the voltage level times the current and that for a given voltage level higher current levels (which result from lower impedances) will afford greater power input to the arc. Of course it will be realized that a minimum residual impedance in the supply circuit is necessary as a stabilizing element to prevent a runaway short circuit condition which would destroy the power source. The exact value of the minimum necessary impedance will of course vary from one particular circuit to another and will be determined by many factors extraneous to the present invention. Of course it will be realized that the above discussion eliminates the considerations of power factor which in practice would necessarily have to be taken into account for any particular furnace in order to determine the conditions under which the maximum useful power is supplied to the arc in the form of heat. Such power factor considerations, however, are not directly relevant to the present invention the techniques of which are applicable to any furnace independently of its particular characteristics.

As noted above, the lack of symmetry between the three respective phases of the conventional three phase furnace has in the past resulted in a lack of current balance between the phases which has precluded operation at maximum efficiency. In the past, for example, it has been the practice in larger furnaces to use a group of 36 parallel connected air cooled conductors to form the flexible cable of each phase. The three flexible cables were then mounted in equally spaced relationship next to each other so that a common straight line could be passed through their geometrical centers at any point along the cable locus. In such an arrangement the spacing between the first and second cable is the same as that between the second and third cable whereas the spacing between the first and third cable is twice that of the other two pairs. Hence, the mutual inductance between the first and the third cables is smaller than that between the other two pairs. This difference in mutual inductance between the cables is a contributing factor to the above discussed lack of electrical symmetry in conventional arrangements and the resulting disadvantages thereof. The cable arrangements described herein are provided to eliminate these problems and to achieve substantially balanced impedances between the three phases as well as an absolute reduction of impedance values in order to supply more useful power to the arcs at a given voltage level to achieve longer refractory life, substantially equal electrode consumption rates, and uniform heat generation throughout the furnace.

In the drawings there is shown in FIGURE 1 a typical electric arc furnace having a cylindrical refractory lined furnace chamber 10 with a hinged top 11 which may be swung to open position in order to recharge the furnace. A group of three electrodes 12, 13 and 14 are mounted to project vertically down through the top of the furnace to the interior thereof. The electrodes 12, 13 and 14 may be mounted for vertical motion up and down along the supporting framework 15 or any other suitable supporting means. The furnace is of course provided with the usual ports for discharging molten metal.

The furnace 10 is mounted in relative close proximity to the wall 16 of the building housing the furnace. On the wall 16 is a connector mounting panel 17. On the panel 17 are mounted connecting terminals 18, 19 and 20 for the cables 21, 22 and 23, respectively forming the three phases of the power system. Of course it will be understood that the cable 21 is connected to electrode 12, the cable 22 is connected to electrode 13, and the cable 23 is connected to electrode 14 by conventional connectors (not shown) at the rear of the furnace. It will further be understood that each of the cables 21, 22 and 23 respectively though shown as a single unit will normally comprise some 36 separate air cooled cables.

It will be noted that the centrally positioned cable 22 is longer than and hangs below the side cables 21 and 23.

In a conventional prior art type of installation each of these three cables 21, 22 and 23 would be of the same length and each would consist of some 36 air cooled conductors connected in parallel for each phase. In such a conventional arrangement the impedance of each phase would range from 3.73 to 4.25 ohms giving an average of 4 ohms but exhibiting the impedance unbalance described above. In the type of furnace to be discussed by way of example herein, each of the cable groups might reasonably be approximately twenty-four feet in length. In accordance with the present invention and as shown in greater detail in FIGURES 1, 2 and 3, the impedances of the three phases may conveniently be made substantially equal by making the center cable 22 longer than the side cables 21 and 23 so that when the electrodes are in the normal operating position shown in FIGURE 1 the center cable at its lowest point will hang lower than the side cables 21 and 22 resulting in the triangular configuration shown in cross section in FIGURE 3. This lengthening of the center phase cable which may by way of example be made some ten feet longer than the side cables so that for twenty-four foot side cables the center cable is approximately thirty-four feet, results in each of the phases having an impedance of substantially four ohms. That is to say, the lengthening of the center cable results in a substantially equal distribution of impedances between the phases but does not lead to any overall absolute reduction in the value of the impedance of each phase. This longer center phase arrangement, however, does solve the problem of being forced to choose between down time due to burning out of the refractory lining or unequal consumption of carbon electrodes. With this arrangement, the three arcs may be made of equal length thereby eliminating unequal heat distribution and achieving equal electrode consumption.

In FIGURES 4 through 8 there is shown another embodiment of improved cable arrangement wherein water cooled cables held in a predetermined relationship to each other by mechanical spacers are used instead of the air cooled randomly disposed cable groups. In both the conventional arrangement and the arrangement shown in FIGURES 1 through 3 the air cooled bare cables are normally spaced on approximately forty inch centers. In the arrangement shown in FIGURES 4 through 8, on the other hand, the distance between the phases is reduced to approximately twenty-eight inches which is one factor contributing to the reduction of impedance. If air cooled cables were used at such relatively close spacing there would be arc over and shorting between the phases. In both the arrangement of FIGURES 1 through 3 and that of FIGURES 4 through 8 it will be understood that conventional practice is followed in that the transformer is connected Δ—Δ, the power input transformer normally having a voltage step down ratio to bring line voltage of 13,800 volts down to 445 volts at the secondaries. Furthermore, as may be seen in FIGURE 1, conventional hose and line connections for air and/or water to the furnace are brought out from the connector panel 17 and may be disposed adjacent to the flexible cables.

By the arrangement shown in FIGURES 4 through 8 and to be described in detail below the impedance of the three phases is reduced from the above noted average value of four ohms to a level at which the two outer or side phases have 2.12 ohm impedances and the center phase has an impedance of 2.27 ohms. These figures are applicable to the configuration shown in which the two outer phases each consist of four water cooled cables in spaced relationship whereas the center phase consists of two spaced cables, the interphase center spacing being reduced from forty inches to twenty-eight inches and the overall length of the cables being twenty-four feet for the upper cables and twenty-seven feet for the lower cables in order to maintain the symmetry of spacing. As noted above, the closer spacing is achievable by use of the water cooled cable since bare air cooled cables at these distances would short. It should also be noted that the total cross-sectional area of the four cables of either of the outer phases is equal to only about fifty percent of the total cross-sectional area of the thirty-six randomly arranged cables of a conventional phase. There is, thus, a substantial saving in the cost of copper as well as in the efficiency of operation. In the particular configuration being discussed the mechanical spacers were shaped to provide a twenty inch spacing between the centers of adjacent cables in any one given phase.

In FIGURE 4 there is shown a side elevational view of the four-two-four spaced water cooled cable arrangement. It will be noted that the wall 16 of the building again supports the connector or terminal plate 17 to which each of the cables in each phase is connected in any conventional or convenient manner.

Figure 5:
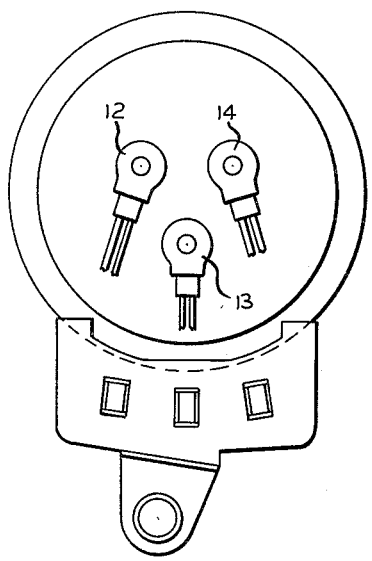
FIGURE 5 is a top plan view showing the electrode arrangement in a furnace of the type shown in FIGURE 1 and the manner of connecting cables of the type shown in FIGURES 2 and 4 thereto.

In FIGURE 5 there is shown a top plan view of a furnace of the type shown in FIGURE 1 to illustrate the geometrical arrangement of the electrodes 12, 13 and 14. It will be understood that this same configuration is used both in the prior art and in either embodiment of the present invention. The electrodes 12, 13 and 14 are shown with conventional cable connections thereto and are mounted on the top of the furnace in such a fashion that the electrodes may be raised or lowered within the furnace or may be swung to one side to permit recharging of the furnace. Of course, in any arrangement of cables sufficient length and flexibility of the cables must be provided to accommodate these necessary motions.

Returning to FIGURE 4 it will be noted that the cables for the first outer phase 28 extend from the connecting plate 17 to the connectors for electrode 12. As may also be seen in FIGURES 6, 7 and 8 the first phase 28 consists of the four cables 28a, 28b, 28c, and 28d. These four cables are held in a relative position such that their centers are twenty inches apart by a plurality of mechanical spacers of any suitable configuration. The spacers may, for example, comprise a yoke or a ring such as the ring 31a which is slidably positioned around the cable 28a, there being a similar ring or yoke around each of the other cables. The yokes 31a and 31b are, for example, rigidly joined together by a spacer bar such as the bar 32. It will be understood that the yokes 31 are sidably but snugly received around the water jacket of the cables so that they are naturally held in relatively fixed position but will accommodate some flexing in motion of the cable. If it is desired to secure any given assembly in position any suitable type of set screw or other arrangement may of course be used. The spacer arms 32 may similarly be secured to the yokes 31 in any convenient manner as by a butt joint or by seating the spacer arm in recesses in the yokes and gluing, screwing, or otherwise attaching them thereto.

It will be noted particularly from the detail views on the enlarged scale of FIGURES 7 and 8 that each of the cables 28a, 28b, 28c, 28d, etc. is provided with a jacket such as the jackets 33a, 33b, 33c, and 33d which concentrically surround the cables therein and afford a space through which cooling water may be circulated. Of course it will be understood that the inner cable is electrically insulated from this water in a manner well known in the art. Applicant in this invention is not claiming any novelty in the water cooled cable as such but merely in its configuration in this particular type of apparatus for the purposes specified above. In fact, conventional commercially available water jacketed cable can readily be used.

As may be seen most clearly from FIGURES 4 and 6, the first outer phase 28 consists of four cables arranged at the corners of a square the sides of which are each twenty inches and which are held in this relative spacing throughout their twenty-four foot length (for cables 28b and 28c) or twenty-seven foot length (for cables 28a and 28d) by the mechanical spacing elements consisting of the yokes 31 and arms 32.

The center phase 29, on the other hand, consists of only the two cables 29a and 29b respectively which are held at a predetermined center-to-center distance of twenty inches by a similar yoke and spacer arrangement. The center of cable 29a, on the other hand, is separated from the center of cable 28d by only eighteen inches so that the center of the middle phase 29 is separated from the geometric center of the first outer phase 28 by a total of twenty-eight inches. This smaller interphase spacing is maintained simply by modifying the positions of the contact terminals on the plate 17 and the connections to the electrode buses for electrodes 12, 13 and 14.

The third or other outer phase 30 is identical to the first outer phase 28 and is symmetrically positioned by comparison therewith to the center of symmetry formed by the center phase 29. Thus, the third phase 30 consists of the four cables 30a, 30b, 30c, and 30d, maintained with their centers at the corners of a square having twenty-inch sides by spacer arrangements similar to those discussed above. The center of cable 30a, on the other hand, is separated from the center of cable 29a by a distance of eighteen inches so that the center of the phase 30 as a whole is separated from the center of phase 29 by a distance of twenty-eight inches.

These distances and dimensions for the spacing and arrangement of the cable have as a practical matter been found to give the above noted impedances of 2.12 ohms, 2.27 ohms, and 2.12 ohms respectively for the three phases 28, 29 and 30 using a cable size of 7,200,000 circular mils. While the complete explanation of this desirable reduction of impedance and balancing of impedances between ohms with its attendant operating advantages as outlined above is not fully apparent in terms of transmission line theory, nonetheless these desirable results have been experimentally proven to be obtainable with apparatus constructed in accordance with the teachings herein. It will further be apparent to those skilled in the art that various modifications could be made in this arrangement and that these precise dimensions are given by way of illustrative example only. Thus, in accordance with the basic teachings of the present invention it is desirable to balance the impedances between the three phases either by lengthening the center phase of an air cooled cable arrangement or by replacing the air cooled cable with water cooled cables of considerably smaller overall cross section. These water cooled cables are arranged in a symmetrical pattern in which relationship they are held by mechanical spacers in order to achieve a desired mutual coupling relationship. In general, reducing the distance between the two outer phases tends to improve the coupling therebetween.

While particular exemplary preferred embodiments of the invention have been described in detail above it will be understood that modifications and variations therein may be effected without departing from the true spirit and scope of the novel concepts of the present invention as defined by the following claims.

We claim as our invention:

1. A power cable arrangement connecting a source of electrical power to three electrodes movably mounted in an electric arc furnace comprising, a plurality of parallel connected flexible cables connecting each of said electrodes to said source of power to form a three phase circuit, the cables forming a first of said phases being positioned generally intermediate the cables forming the second and third phases respectively, said cables of said first phase having an overall length of approximately thirty-four feet and said cables of said second and third phase having an overall length of approximately twenty-four feet, said cable arrangement and dimensions thereby providing substantially equal impedances for each of said three phases.

2. A power cable arrangement connecting a source of electrical power to three electrodes in an electric arc furnace to form a three phase circuit for supplying power to the arcs of said furnace comprising, a first group of four liquid cooled cables connected in parallel between a first of said electrodes and a first phase source of said source of power, a second group of two liquid cooled cables connected between a second of said electrodes and a second phase source of said source of power, and a third group of four liquid cooled cables connected in parallel between a third of said electrodes and a third phase source of said source of power, the four cables of said first and third phases being held in predetermined spaced relationship at the corners of squares having twenty inch sides by a plurality of mechanical spacer units, the two cables of said second phase being held with their centers twenty inches apart by mechanical spacer units, the cables of said first and third phases being positioned in parallel relationship to each other throughout their length and adjacent cables thereof being separated by a distance of thirty-six inches, the cables of said second phase being positioned intermediate between those of said first and third phases and separated from each by an equal distance so that the centers of the cables of said second phase are separated from the centers of the nearest cables of said first and third phases by a distance of eighteen inches.

3. A power cable arrangement connecting a source of electrical power to the three electrodes of an electric arc furnace comprising, a three phase connected transformer having its primary windings connected to said source of electrical power, a plurality of flexible water cooled cables connected between the secondary windings of said transformer and said electrodes, the cables of each of said three phases respectively being connected in parallel with each other electrically and being held in predetermined spaced relationship to each other by mechanical spacer elements, the cables of said three phases respectively being dimensioned and positioned with respect to each other so that the impedance of each phase is between two and three ohms.

4. A power cable arrangement for connecting a source of electrical power in a three phase circuit to the three electrodes of an electric arc furnace comprising, first, second and third groups of flexible water cooled cables connected between said first, second and third electrodes respectively and said source of electrical power, the cables in each group being connected in parallel with each other, the first and third groups of cables containing four cables each positioned with its center at the corner of a square having a twenty inch side, said cables being held in said corner positions by mechanical spacer elements extending between said cables, said second group of cables comprising two cables held parallel to each other separated by a distance of twenty inches by mechanical spacer elements, half of the cables in each of said groups having a total overall length of twenty-four feet and the other half of the cables in each of said groups having a total length of twenty-seven feet, said twenty-four foot cables being positioned directly above said twenty-seven foot cables throughout the span of said flexible cables, said cables of said second group being positioned parallel to and intermediate between said cables of said first and third groups, the centers of the cables of said second group being separated from the centers of the nearest cables of said first and third groups by a distance of eighteen inches, said dimensions and positions of said cables being such that the total impedance of each phase is between two and three ohms.

5. In an electric arc furnace, a furnace chamber, three electrodes adjustably mounted on said first chamber, a three phase electrical power source having three terminals in fixed positions relative to said chamber, first, second and third flexible cable means interconnecting said electrodes and said terminals, said first and second flexible cable means having effective center lines extending along generally U-shaped paths in parallel planes, said third flexible cable means having an effective center line extending along a generally U-shaped path in a plane parallel to and intermediate said parallel planes, the positions of said electrodes being thereby adjustable relative to said terminals, and the effective cross-sectional size to length ratio of said third flexible cable means being substantially less than the effective cross-sectional size to length ratios of said first and second flexible cable means to equalize the impedances of said cable means.

References Cited in the file of this patent

UNITED STATES PATENTS 2,853,636    Ploen _____ Sept. 23, 1958
2,908,736    Ernst _____ Oct. 13, 1959

OTHER REFERENCES

Test—"Electrical Power Transmission," McGraw-Hill Book Company, Inc., New York, 1928; page 52.